Sept. 19, 1967   H. E. JACKSON   3,342,449
METERING VALVES AND CONTROL DEVICES
Filed Feb. 23, 1965   2 Sheets-Sheet 1

Sept. 19, 1967         H. E. JACKSON         3,342,449

METERING VALVES AND CONTROL DEVICES

Filed Feb. 23, 1965         2 Sheets-Sheet 2

United States Patent Office 3,342,449
Patented Sept. 19, 1967

3,342,449
METERING VALVES AND CONTROL DEVICES
Harold E. Jackson, Devon, England, assignor to Petrol Injection Limited, Devon, England, a British company
Filed Feb. 23, 1965, Ser. No. 434,418
Claims priority, application Great Britain, Feb. 25, 1964, 7,893/64
7 Claims. (Cl. 251—58)

ABSTRACT OF THE DISCLOSURE

A metering valve mechanism in which an elongated transverse slot in the wall of a tubular valve member rotatable in a sleeve, registers with a rectangular aperture in the sleeve wall to define a metering orifice. The slot is symmetrical about an axis parallel to the longitudinal axis of the valve member, and the projection of the slot on a plane through these two axes is a straight-sided V-shape. Rotation of the valve member varies the area of the metering orifice. A piston, exposed on one side to a first control pressure, e.g. a vacuum, is coupled to a pivoted cam engaging with a cam follower carried by the tubular valve member so that movement of the piston causes rotation of the tubular valve member to an extent determined by the change in first control pressure. In certain positions of the cam, the first control pressure can be overridden by a second control pressure which pivots another cam into engagement with the cam follower.

---

This invention relates to metering valves and to metering valve mechanisms incorporating such valves.

According to the present invention a metering valve includes a tubular valve member mounted in a closely fitting sleeve so that the valve member and the sleeve can be rotated relative to one another, the valve member having an elongated transverse slot in its curved surface and the sleeve having an aperture in its wall for co-operation with the elongated slot to define a metering orifice, the area of which can be varied by relative rotation between the valve member and the sleeve. The elongated slot has an axis of symmetry parallel to the longitudinal axis of the tubular member and is so shaped that the sides of the slot define a straight-sided V-shape when projected onto a plane which contains the axis of symmetry and the longitudinal axis of the tubular member. the tubular member, which may be closed at one end, can be connected to supply fluid to be metered to the orifice, or to receive metered fluid from the orifice.

The invention also provides a metering valve mechanism incorporating a metering valve as defined above and means responsive to at least one control parameter to cause relative rotation between the valve member and the sleeve to vary the area of the metering orifice.

In one embodiment, the valve sleeve is secured and the valve member mounted for rotation therein, being coupled to means responsive to a desired control parameter. For example, the control parameter may be a fluid pressure, for example vacuum pressure, in which case fluid pressure responsive means can be suitably coupled to the valve member to cause rotation thereof in response to changes in the control parameter. A suitable coupling arrangement is a cam member connected to a piston exposed to the control pressure and co-operating with a cam follower conneced to rotate the valve member in response to movements of the cam. The metering mechanism can include a second control parameter responsive device coupled to a second pressure responsive means for overriding the first mentioned control parameter responsive means upon actuation of the second control parameter responsive means. The arrangement can be such that the second control parameter responsive means can override the first only when the latter responds to predetermined conditions of the first control parameter.

When the sleeve is secured, it can be so secured by releasable means to permit circumferential adjustment of the sleeve relative to the valve member for metering control setting.

The sleeve aperture can have a rectangular shape and provide a window sufficient to accommodate half the circumferential length of the elongated slot.

The present invention provides an efficient but relatively easily constructed metering valve. The transverse elongated slot permits of accurate metering and can be cut to closely controlled dimensions by a simple machining operation. In addition, the securing of one of the components, i.e. the valve member and the sleeve, relative to the other by releasable means, provides a simple arrangement for carrying out metering adjustment without dismantling the valve.

By way of example, embodiments of the invention will be described in greater detail with reference to the accompanying drawings, in which.

Figure 1:
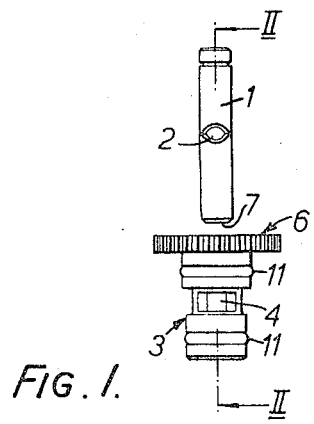
FIG. 1 is an exploded elevation of a metering valve embodying the invention.

In FIG. 1 there is shown an exploded view of a metering valve according to the invention and comprising a tubular valve member 1 having, intermediate its ends, a transverse elongated slot 2 cut in its curved surface and extending approximately diametrically across the member 1. The elongated slot has an axis of symmetry parallel to the longitudinal axis of the tubular member and is so shaped that the sides of the slot define a straight-sided V-shape when projected onto a plane which contains the axis of symmetry and the longitudinal axis of the tubular member. FIG. 1 also shows a sleeve 3 having a bore so dimensioned that the valve member 1 closely fits therein whilst permitting relative rotation between the valve member 1 and the sleeve 3. The wall of the sleeve 3 has a rectangular aperture 4 the width of which corresponds to the greatest width of the slot 2, whilst the circumferential length of the aperture 4 corresponds to about half the greatest circumferential length of the slot 2.

Figure 2:
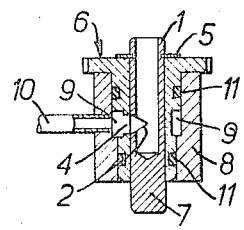
FIG. 2 is a section on the line II—II in FIG. 1 with the components assembled.

When the components 1 and 3 are assembled together, as shown in FIG. 2, a spring clip 5 engages the periphery of the valve member 1 as well as a face at the end 6 of the sleeve 3 to locate the elongated slot 2 in axial registration with the aperture 4 of the sleeve 3. One end 7 of the tubular member is closed.

Figure 3:
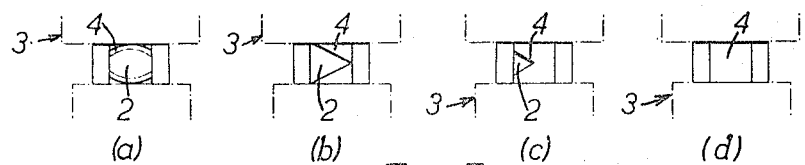
FIG. 3 illustrates the operation of the metering orifice in FIGS. 1 and 2.

As shown in FIG. 1, the valve member 1 and the sleeve 3 are so orientated that when the elongated slot 2 and the aperture 4 are in registration, the slot 2 uncovers a maximum area of the aperture 4, as better shown in FIG. 3a. Relative rotation between the valve member 1 and the sleeve 3 varies the area of the aperture 4 uncovered by the slot 2 and hence the area of the metering orifice defined by the slot 2 in conjunction with the aperture 4. FIG. 3 shows various orientations of the tubular member 1 and the sleeve 3 in which the slot 2 uncovers differing areas of the aperture 4. As just mentioned, FIG. 3a shows the slot 2 uncovering a maximum area of the aperture 4, FIG. 3b shows the right-hand end of the slot 2 (as seen in FIG. 3) in registration with the right-hand edge of the aperture 4; FIG. 3c shows the tubular member when rotated clockwise relative to the sleeve 3 to a position in which the right-hand end of the slot 2 is located about half-way along the aperture 4 and FIG. 3d shows the tubular member rotated still further in a clockwise direction to move the right-hand end of the slot 2 past the left-hand end of the aperture 4 which thus is closed.

FIG. 2 shows the sleeve 3 mounted in a tube 8 with the aperture 4 leading to a peripheral recess 9 around the sleeve 3, the recess being located opposite a conduit 10 extending into an aperture in the wall of the tube 8. O-ring seals 11 between the sleeve 3 and the bore of the tube 7 provide a fluid tight seal on either side of the recess 9. A source of fluid to be metered can be connected to the conduit 10 and the amount of fluid passing through the orifice and thence through the open end of the valve member 1, will depend on the area of the aperture 4 uncovered by the slot 2. Thus, if the slot 2 and the aperture 4 are relatively positioned as shown in FIG. 3a a maximum amount of fluid will pass through the metering orifice, progressively lesser amounts will pass for the relative positions shown in FIGS. 3b and 3c and the orifice will be closed for the relative positions shown in FIG. 3d.

The metering valve shown in and described with reference to FIGS. 1–3 is simple in construction and the elongated slot 2 can readily be cut with a high degree of accuracy, thus ensuring efficient metering by the valve. The valve can be so mounted that the sleeve 3 is fixed and the valve member 1 rotatable within the sleeve, or vice versa. In the former case, the sleeve can be releasably fixed so that the circumferential position of the sleeve 3 relative to the valve member 1 is adjustable. The valve member 1 can receive metered fluid from the metering orifice, as described above, or be used to supply fluid to be metered to the orifice. The tubular member also can be open at both ends and not only at one as described above.

Figure 4:
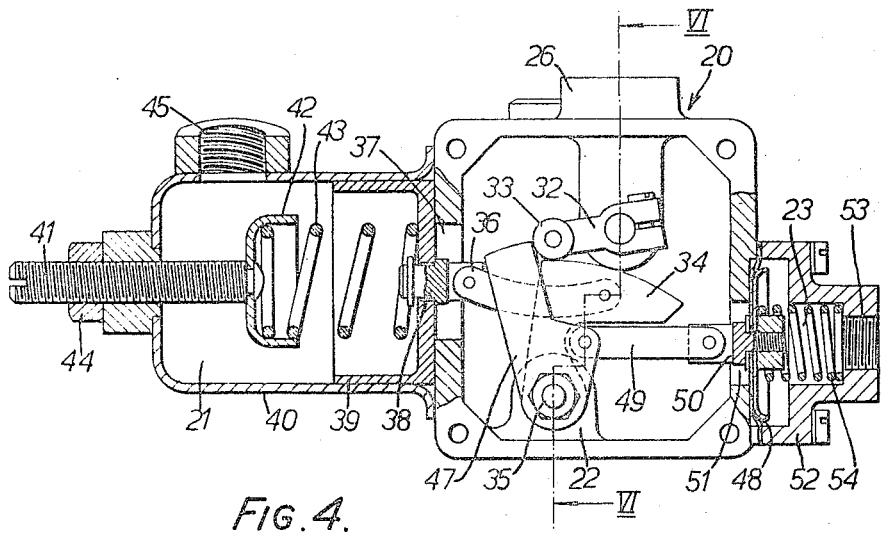
FIG. 4 is a partly sectioned side elevation of a metering valve mechanism embodying a metering valve according to the invention with a cover plate removed.
Figure 5:
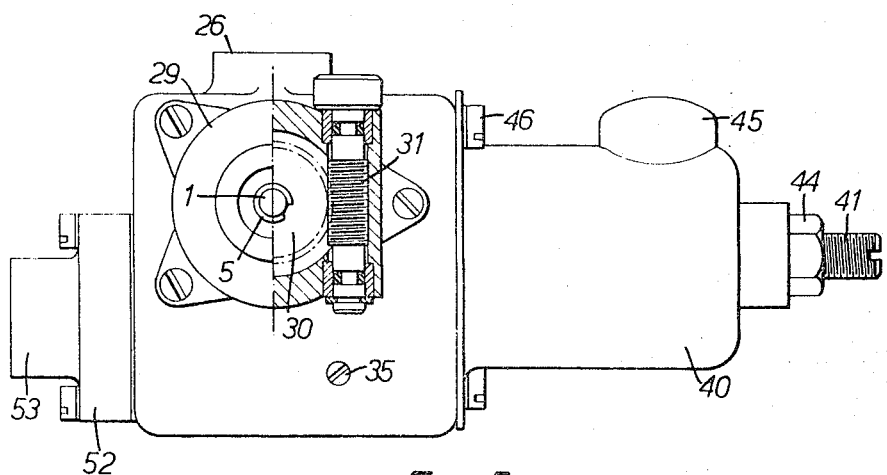
FIG. 5 is a partly sectioned elevation of the opposite side of the device shown in FIG. 4.
Figure 6:
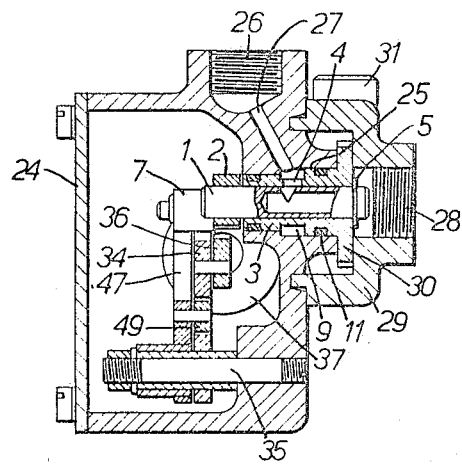
FIG. 6 is a cross-section on the line VI—VI in FIG. 4.

FIGS. 4–6 show a metering valve mechanism incorporating a metering valve according to the invention and of the type shown in FIGS. 1–3. The mechanism has a casing 20 in which are defined three chambers 21, 22 and 23. The central chamber 22 is generally rectangular having one side closed by a cover plate 24 (FIG. 6) and in a thickened portion of the opposite wall there is a cylindrical aperture 25 in which is accommodated a metering valve of the type shown in FIGS. 1 and 2. In a wall of the chamber 22, extending perpendicularly to the cover plate 24 there is formed a port 26 from which a passage 27 communicates with the recess 9 in the sleeve 3 of the metering valve. The open end of the tubular valve member 1 communicates with a port 28 in a cover 29 surrounding the aperture 25. (In FIG. 6, the thickened portion of the wall defining the aperture 25 corresponds with the tube 8 in FIG. 2 and the passage 27 corresponds to the conduit 10 in FIG. 2).

The end of the sleeve 3 defining the face 6 is formed as a gear 30 and a screw 31 extending through and captively mounted in the cover 29 engages the gear 30. The sleeve 3 thus is held fixed relative to the member 1 which can be rotated therein but rotation of the screw 31 permits radial adjustment of the sleeve 3 relative to the member 1.

The closed end 7 of the valve member 1 projects beyond the sleeve 3 and has clamped to it for rotation therewith, a radially projecting arm 32 carrying a roller 33 that engages the shaped surface of a cam 34 mounted on a pivot pin 35 secured in a boss formed on the wall providing a mounting for the metering valve.

A link 36 is pivoted at one end to the cam 34, the other end extending through an aperture 37 in the wall dividing the chamber 22 from the chamber 21 and being pivoted to a yoke 38 secured in the head of a hollow piston 39 slidably mounted in a cup-shaped cap 40 defining the chamber 21. A screw 41 is threadedly mounted in the closed end of the cap 40 and extends into the chamber 21 having a cup 42 which retains a spring 43 bearing against the head of the piston 39. The screw 41 serves to provide means for adjusting the force exerted by the spring 43 on the piston 39, urging the piston to the position shown in FIG. 4, and has a locking nut 44 for securing the screw 41 in a desired position. The cap 40 has a port 45, leading to the chamber 21, and is secured to the casing 20 by screws 46.

Also pivoted on the pin 35 is a cam 47 disposed by the side of the cam 34. Under certain conditions, to be explained later, the cam 47 can co-operate with the roller 33 and override the cam 34. The cam 47 is coupled to a pressure responsive diaphragm 48 by a link 49 coupled at one end to the cam and at the other to a yoke 50 carried by the diaphragm. The diaphragm extends across an aperture 51 in a wall of the chamber 22 opposite the cup 40 and is surrounding externally of the chamber 22 by an enclosure 52, defining the chamber 23, and having a port 53 communicating with the chamber 23. A spring 54 urges the diaphragm 48 to the left, as seen in FIG. 4.

The device described with reference to FIGS. 4–6 may be used to meter fluid flow between the ports 26 and 28 in dependence on a source of vacuum connected to the port 45. For the moment it will be assumed that the port 53 is disconnected and that no pressure differential exists across the diaphragm 48.

With the pressure in the chamber 21 at atmospheric pressure, the piston 39 occupies the position shown in FIG. 4, the cam 34 engages the roller 33 at one end of the travel of the cam surface and a flow of fluid occurs between the ports 26 and 28 through the metering orifice defined by the relative position of the elongated slot 2 and the aperture 4, flow having been set at a desired value by adjustment of the relative radial positions of the sleeve 3 and the valve member 1 by adjustment of the screw 31. The cam surface of the cam 47 does not engage with the roller under these conditions.

If now the pressure within the chamber falls below atmospheric pressure, the piston will be retracted within the cup 40 against the spring 43, rotating the cam 34 in an anticlockwise sense, as seen in FIG. 4, about the pin 35. The cam surface of the cam 34 thus moves over the holler 33 and rotates the valve member 1 in a clockwise sense, as seen in FIG. 4, relative to the sleeve 3, reducing the area of the aperture 4 uncovered by the elongated slot 2 and restricting the fluid flow across the orifice and hence between the ports 26 and 28. As the pressure in the chamber 21 falls, the metering orifice of the metering valve is further reduced in area and the fluid flow between the ports 26 and 28 are further restricted until the opposite end of the cam surface of the cam 34 to that shown in FIG. 4 engages with the roller 33 in which condition the metering orifice may be completely closed, shutting off fluid flow between the ports 26 and 28.

In certain applications of the metering device, e.g. as a metering valve in a liquid fuel injection system as described in the specification of my Patent No. 3,285,233 and co-pending application Ser. No. 434,417, filed Feb. 23, 1965, it may be required that under certain conditions the flow should be reduced below that indicated by the vacuum in chamber 21. To this end, the port 53 may be interruptedly connected to a second vacuum source and the cam 47 so dimensioned relative to the cam 34 that it lifts the roller 33 off the cam 34 in certain positions of the cam 47. When the vacuum pressure in chamber 21 increases sufficiently the cam 34 will again take over control of the metering valve.

It will be appreciated that the relationship between fluid metering and vacuum pressure can be determined by the dimensions of the slot in the valve member 1 and that various relationships can be obtained merely by changing that valve member. In addition, the relationship can be adjusted by varying the force exerted on the piston 39 by the spring 43. The particular portion of the slot used to co-operate with the aperture 4 can be adjusted by the screw 31 to rotate the sleeve 3 relative to the valve member 1.

The metering valve can be arranged to operate in the opposite sense to that described above, i.e. to open in response to increasing vacuum applied in chamber 21.

The metering device described is thus susceptible of accurate metering of fluid and provides ready adjustment facilities of the metering and the manner of its control.

I claim:

1. A metering valve mechanism including a sleeve and a tubular valve member mounted in and closely fitting the sleeve so that the valve member can be rotated relative to the sleeve, the valve member having in its curved surface an elongated slot which extends transversely of the valve member and is so located that it can register with an aperture in the sleeve to define a metering orifice, the valve member having a longitudinal axis and the said transverse slot having an axis of symmetry which is parallel to the said longitudinal axis of the valve member, the slot being so shaped that the sides of the slot define a straight-sided V-shape when projected on to a plane which contains the said longitudinal axis of the valve member and the said axis of symmetry of the slot, first and second control parameter responsive devices, a first cam member coupled to the first control parameter responsive device for movement of the cam member in response to changes in said first control parameter and a cam follower carried by the valve member to rotate said valve member in said sleeve in response to movement of said first cam member to adjust the area of said metering orifice, and a second cam member coupled to the second control parameter responsive device for movement of the second cam member into engagement with said cam follower in response to predetermined changes in said second control parameter to override said first cam member and rotate said valve member in said sleeve.

2. A metering valve mechanism according to claim 1, in which said second cam member is adapted to override said first cam member only when the first control parameter responsive device responds to predetermined first control parameter conditions.

3. A metering valve mechanism according to claim 1, in which said second control parameter is a fluid pressure and the second control parameter responsive device is a resilient diaphragm.

4. A metering valve mechanism including a tubular valve member so mounted in a closely fitting sleeve that the valve member can be rotated relative to the sleeve, the valve member having in its curved surface an elongated slot which extends transversely of the valve member, said elongated slot being symmetrical about an axis parallel to the longitudinal axis of the tubular member and so shaped that the sides of the slot define a straight-sided V-shape when projected onto a plane which contains the said longitudinal axis of the tubular member and the said axis of symmetry of the slot, said valve member being so located in said sleeve that said elongated slot can register with an aperture in the sleeve to define a metering orifice, a control parameter responsive device and means operably coupling said device to said valve member to rotate said valve member in said sleeve and thereby vary the area of said metering orifice in response to variations in said control parameter.

5. A metering valve mechanism including a tubular valve member having in its curved surface an elongated slot which extends transversely of the valve member, said elongated slot being symmetrical about an axis parallel to the longitudinal axis of the valve member and so shaped that the sides of the slot define a straight-sided V-shape when projected onto a plane which contains said longitudinal axis of the tubular member and said axis of symmetry of the slot, a sleeve in which said valve member is mounted for rotation relative to said sleeve, said valve member closely fitting said sleeve and being so located that said elongated slot can register with an aperture in said sleeve to define a metering orifice, a piston member and means for exposing said piston member to a fluid control pressure to move said piston member in response to changes in said fluid control pressure, and means coupling said piston member to said valve member to effect rotation of said valve member relative to said sleeve to adjust the area of said metering orifice in response to movement of said piston member.

6. A metering valve mechanism according to claim 5, in which said means coupling said piston member to said valve member comprises a cam member mounted for pivotal movement and coupled to said piston member for pivotal movement in response to movement of said piston member, and a cam follower carried by said valve member and engage by said cam member to rotate said valve member in said sleeve in response to pivotal movement of said cam member.

7. A metering valve mechanism including a sleeve and a tubular valve member mounted in and closely fitting the sleeve so that the valve member can be rotated relative to the sleeve, the valve member having in its curved surface an elongated slot which extends transversely of the valve member and is so located that it can register with an aperture in the sleeve to define a metering orifice, the valve member having a longitudinal axis and the said transverse slot is having an axis of symmetry which is parallel to the said longitudinal axis of the valve member, the slot being so shaped that the sides of the slot define a straight-sided V-shape when projected onto a plane which contains the said longitudinal axis of the valve member and the said axis of symmetry of the slot, first and second control parameter responsive devices, means operably coupling said first control parameter device to said valve member to rotate the valve member in said sleeve, to adjust the area of said metering orifice in response to changes in said first control parameter, and means operably coupling said second control parameter responsive device to said valve member in response to predetermined changes in said second control parameter, to override said first control parameter responsive device and rotate said valve member in said sleeve.

References Cited

UNITED STATES PATENTS

| 1,108,183 | 8/1914 | Kendrick | 251—58 X |
| 1,131,480 | 3/1915 | David | 251—209 X |
| 1,156,392 | 10/1915 | Conrader | 251—58 |
| 1,272,950 | 7/1918 | Hawkins | 251—208 X |
| 2,155,247 | 4/1939 | Warner | 137—56 |
| 2,641,280 | 6/1953 | Fleischhaver | 251—58 X |

M. CARY NELSON, *Primary Examiner.*

A. ROSENTHAL, *Assistant Examiner.*